US012770950B2

(12) United States Patent
Kim et al.

(10) Patent No.: US 12,770,950 B2
(45) Date of Patent: Oct. 20, 2026

(54) APPARATUS FOR DETECTING THERMAL RUNAWAY OF BATTERY FOR ELECTRIC VEHICLE

(71) Applicants: Hyundai Motor Company, Seoul (KR); Kia Corporation, Seoul (KR)

(72) Inventors: Sang Wan Kim, Busan (KR); Jinwon Kim, Pyeongtaek-Si (KR); Min Yong Son, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 847 days.

(21) Appl. No.: 18/075,883

(22) Filed: Dec. 6, 2022

(65) Prior Publication Data

US 2024/0079667 A1 Mar. 7, 2024

(30) Foreign Application Priority Data

Sep. 7, 2022 (KR) ........................ 10-2022-0113243

(51) Int. Cl.

| | |
|---|---|
| ***H01M 50/249*** | (2021.01) |
| ***H01M 10/48*** | (2006.01) |
| ***H01M 10/613*** | (2014.01) |
| ***H01M 10/625*** | (2014.01) |
| ***H01M 50/317*** | (2021.01) |
| ***H01M 50/35*** | (2021.01) |

(52) U.S. Cl.

CPC ....... *H01M 10/613* (2015.04); *H01M 10/486* (2013.01); *H01M 10/625* (2015.04); *H01M 50/249* (2021.01); *H01M 50/317* (2021.01); *H01M 50/35* (2021.01); *H01M 2220/20* (2013.01)

(58) Field of Classification Search

CPC .. H01M 10/613; H01M 10/625; H01M 50/35; H01M 50/249; H01M 50/317

See application file for complete search history.

(56) References Cited

U.S. PATENT DOCUMENTS

| | | | | |
|---|---|---|---|---|
| 2018/0212288 | A1 | 7/2018 | Grace et al. | |
| 2019/0260085 | A1* | 8/2019 | Hagiwara | H01M 4/131 |
| 2021/0101490 | A1* | 4/2021 | Yang | H01M 50/20 |
| 2021/0288378 | A1 | 9/2021 | Okada et al. | |

FOREIGN PATENT DOCUMENTS

| | | |
|---|---|---|
| KR | 10-2022-0076567 A | 6/2022 |

* cited by examiner

*Primary Examiner* — Kenneth J Douyette

(74) *Attorney, Agent, or Firm* — Banner & Witcoff, Ltd.

(57) ABSTRACT

An apparatus for detecting thermal runaway of a battery may include a battery system that includes: a lower cover that forms at least two accommodation spaces; an upper cover coupled to an upper portion of the lower cover; a battery pack assembly, which may include at least one battery module mounted in at least one of the at least two accommodation spaces, and an electronic component for managing the at least one battery module; a venting device positioned away from the electronic component and configured to discharge gas from inside the battery module; and a temperature sensor.

16 Claims, 7 Drawing Sheets

APPARATUS FOR DETECTING THERMAL RUNAWAY OF BATTERY FOR ELECTRIC VEHICLE

CROSS-REFERENCE TO RELATED APPLICATION

This application claims priority to and the benefit of Korean Patent Application No. 10-2022-0113243 filed in the Korean Intellectual Property Office on Sep. 7, 2022, the entire contents of which are incorporated herein by reference.

TECHNICAL FIELD

The present disclosure relates to an apparatus for detecting thermal runaway of a battery, and more particularly, to an apparatus for detecting thermal runaway of a battery for use in a device, and for causing output of a notification to a user of the device.

BACKGROUND

A vehicle, such as an electric vehicle or a hybrid vehicle, may use, as a main or secondary power source, a battery to power a battery engine. The battery may comprise one or more battery cells, which may be rechargeable (e.g., capable of being charged, discharged and recharged). Providing the one or more battery cells in a single pack may enable exhaust gas reduction (e.g., by generating little to no exhaust gas) and allow for operation of the battery and/or battery engine with very little noise.

A hybrid vehicle may use a plurality of power sources (e.g., an internal combustion engine and a motor couple to a battery). Performance of a battery in powering a vehicle may directly affect performance of the vehicle. Accordingly, a battery management system may efficiently manage the charging and discharging of each battery cell by measuring a voltage of each battery cell and the voltage and current of the entire battery, and may determine whether each battery cell is deteriorated, so as to ensure maximum performance of the battery cell.

A lithium-ion battery is a type of rechargeable battery, and has a multilayer structure comprising a positive electrode activated by various mixed oxides or olivine, a negative electrode activated by a specific carbon, and a separator immersed in an organic electrolyte.

In a normal operation, electrical energy may be converted into chemical energy and stored when the battery is charged, and the stored chemical energy may be converted into electrical energy when the battery is discharged. In more detail, lithium in the positive electrode may be ionized and moved layer by layer toward the negative electrode when the battery is charged. The ions may be moved to the positive electrode and return to their original compounds when the battery is discharged.

Self-heating may occur in the lithium-ion battery under an certain conditions, such as overvoltage, overcurrent or over-temperature. The self-heating may cause the lithium-ion battery to enter a thermal runaway state. The self-heating refers to a state in which an internal temperature of the battery cell is increased by an electro-chemical structure inside the battery cell.

The thermal runaway occurring inside a battery module may cause very drastic and great damage. When the thermal runaway occurs, very little oxygen may be produced and the internal temperature may rise above 800 degrees Celsius.

If such a situation occurs, a fire may occur inside the vehicle, or another device powered by and/or housing the battery. Excessive gas may be produced, or a case accommodating the lithium-ion battery cell may be destroyed. In any of these cases, e.g., if a fire occurs in a vehicle using the battery and/or dangerous gases are released, it may cause very serious damage to a driver in the vehicle.

The above background description is provided only to assist in better understanding of the background of the present subject matter, and may thus include information outside of prior art that could be already known to one skilled in the art to which the present disclosure pertains.

SUMMARY

Systems, apparatuses and methods are described herein for detecting thermal runaway of a battery for an electric vehicle is described herein. An apparatus may comprise a first cover that forms at least two accommodation spaces; an second cover configured to be coupled to the first cover so as to form an internal space comprising the at least two accommodation spaces and a tunnel portion between the at least two accommodation spaces; a battery pack assembly comprising at least one battery module mounted in at least one of the at least two accommodation spaces; an electronic component configured to manage the at least one battery module; and a venting device positioned away from the electronic component and the tunnel portion and configured to discharge gas from the internal space.

The above and other features of the disclosure may be described in greater detail below.

BRIEF DESCRIPTION OF THE DRAWINGS

The drawings are provided to describe examples of the present disclosure, and the spirit of the present disclosure should not be construed as being limited to the accompanying drawings.

DETAILED DESCRIPTION

Figure 1:
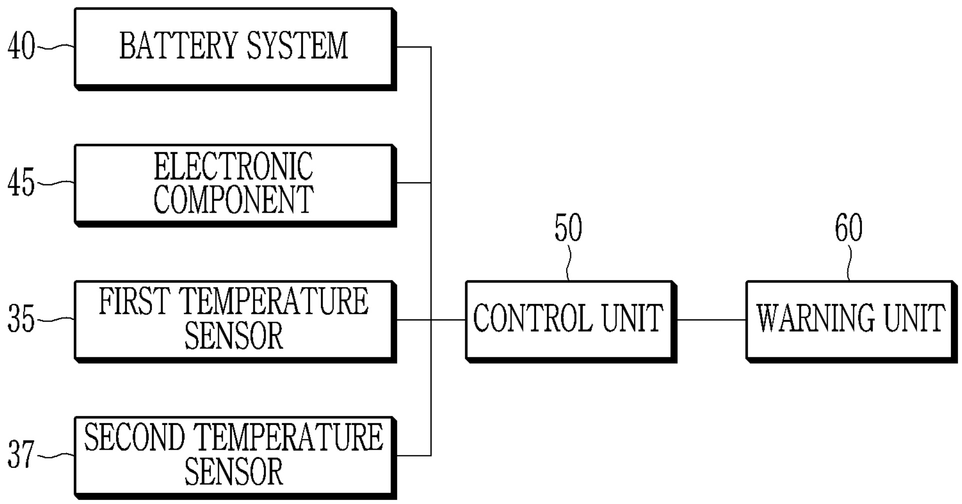
FIG. 1 is a block diagram showing a configuration of an apparatus for detecting thermal runaway of a battery according to an example.
Figure 2:
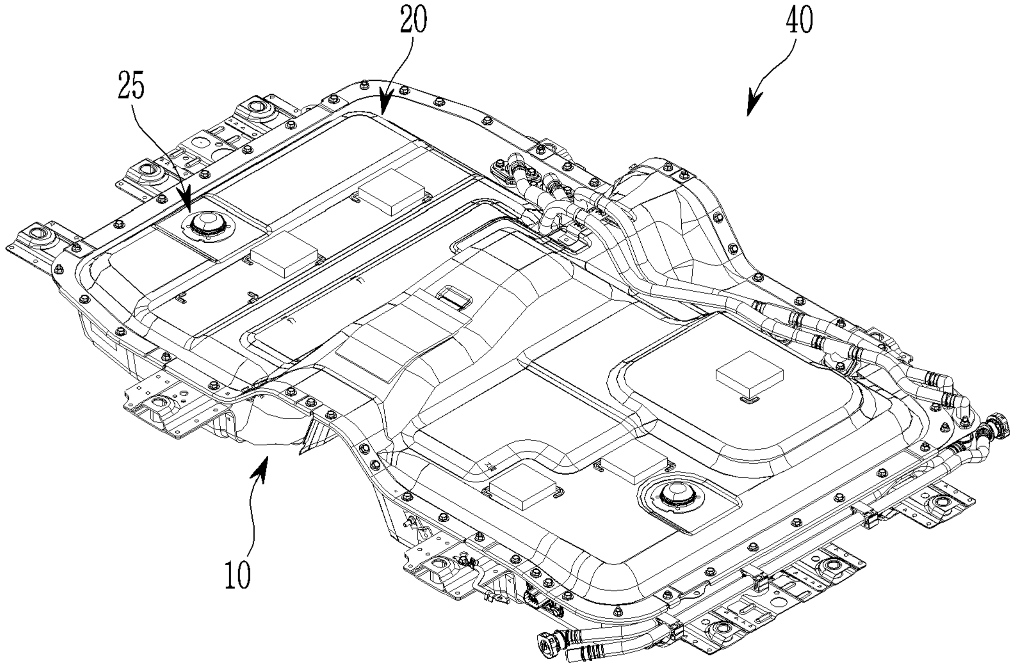
FIG. 2 is a perspective view showing a configuration of a battery system applied to the apparatus for detecting thermal runaway of a battery according to an example.
Figure 3:
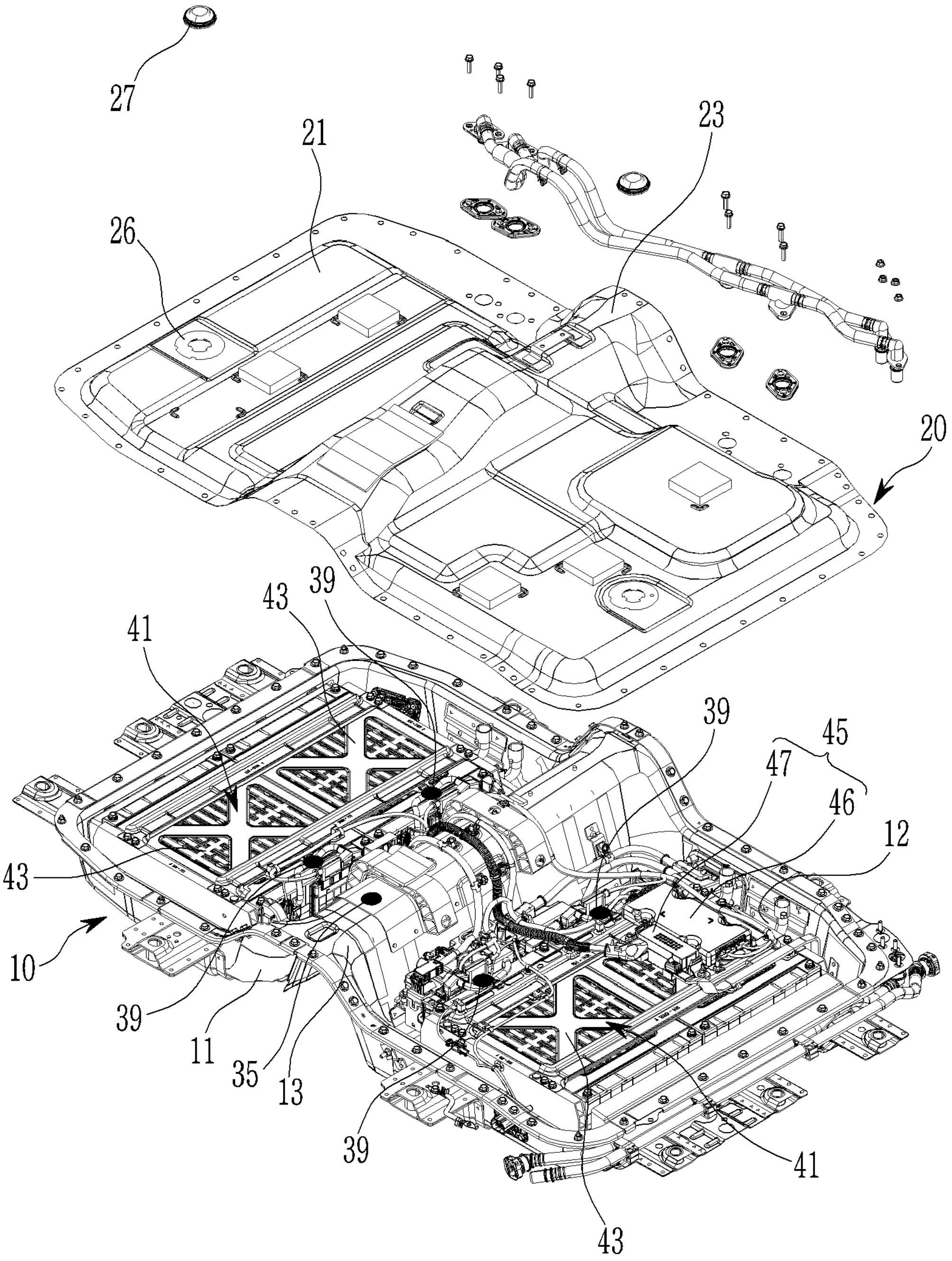
FIG. 3 is an exploded perspective view showing the configuration of a battery system applied to an apparatus for detecting thermal runaway of a battery for an electric vehicle according to an example.

Hereinafter, an example of the present disclosure will be described in detail with reference to the accompanying drawings, so that those skilled in the art to which the disclosure pertains may easily practice the disclosed subject matter. However, one skilled in the art should understand that the described example may be modified in various ways, and the present disclosure is not limited to an example provided herein.

Subject matter and concepts that are well known to one skilled in the art will not be described in this specification. The same or similar components are denoted by the same reference numerals throughout the specification.

In addition, the size, thickness, dimensions, etc. of each component shown in the accompanying drawings are arbitrarily provided for convenience of explanation and are not necessarily to scale. Therefore, the present disclosure is not limited to contents shown in the accompanying drawings, and the dimensions may be exaggerated in the drawings to more clearly represent certain elements. Additionally, words such as “lower”, “upper”, “vertical”, “left”, “right”, “horizontal” used herein refer to directions relative to the apparatus shown in the drawings, (e.g., lower or upper relative to a vertical direction in FIG. 4, and left or right relative to a horizontal direction in FIG. 4). Such words could be replaced with non-directional terms, such as “first”, “second”, etc., so long as the disclosed relationships between components and other features are achieved. For ease of discussion, “lower”, “upper”, “vertical”, “left”, “right”, and “horizontal” will be used throughout the description referring to the figures.

Hereinafter, an apparatus for detecting thermal runaway of a battery (e.g., for an electric vehicle) according to an example is described in detail with reference to the accompanying drawings.

As shown in FIG. 1, the apparatus for detecting thermal runaway of a battery may comprise a battery system 40, a control unit 50 and a warning unit 60.

Referring to FIGS. 2 to 5, the battery system 40 may comprise a lower cover 10, an upper cover 20, and at least one pair of battery pack assemblies 41, which may be mounted between the lower cover 10 and the upper cover 20.

In detail, the lower cover 10 may comprise a pair of lower bodies 11 that form at least a pair of accommodation spaces 12, and a lower central portion 13 positioned between the pair of lower bodies 11. The lower cover 10 may be formed integrally (e.g., by a press mold). That is, the accommodation spaces 12 may respectively be formed in the lower bodies 11 positioned on either sides (e.g., left and right) of the lower central portion 13.

The lower bodies 11 may comprise a first lower body (e.g., left lower body) and a second lower body (e.g., right lower body), and the lower central portion 13 may connect the first lower body and the second lower body with each other.

The pair of lower bodies 11 may have a substantially symmetrical shape with respect to the lower central portion 13, and the lower bodies 11 may each be convex downward to together form the accommodation spaces 12 (e.g., the left lower body may form at least one left accommodation space and the right lower body may form at least one right accommodation space). The lower central portion 13 may connect the pair of lower bodies 11 with each other and be approximately convex upward. Here, a height of the lower central portion 13 may be greater than a height of the accommodation space 12 (e.g., the lower central portion 13 may extend above the portion of the lower bodies 11 that form the accommodation spaces 12).

The lower central portion 13 may comprise a pair of lower inclined portions 13-1 inclined upward and towards each other from an end of one lower body 11 toward the other lower body 11. The lower central portion 13 may also comprise a lower horizontal portion 13-2 connecting the pair of lower inclined portions 13-1 with each other.

The upper cover 20 may comprise a pair of upper bodies 21 corresponding to the pair of lower bodies 11, and an upper central portion 23 positioned between the pair of upper bodies 21. The upper cover 20 may be formed integrally (e.g., by the press mold). The upper central portion 23 may protrude upward (e.g., so as to accommodate the lower central portion 13 when the upper cover and lower cover are coupled.

The upper bodies 21 may comprise a first upper body (or a left upper body) and a second upper body (or a right upper body), and the upper central portion 23 may connect the first upper body and the second upper body with each other.

The pair of upper bodies 21 may have a substantially symmetrical shape with respect to the upper central portion 23, and the upper body 21 may be substantially flat. The upper central portion 23 may connect the pair of upper bodies 21 to each other and be convex upward.

The upper central portion 23 may comprise a pair of upper inclined portions 23-1 inclined upward toward each other (e.g., from an end of one upper body 21 toward the other upper body 21). The upper central portion 23 may also comprise an upper horizontal portion 23-2 connecting the pair of upper inclined portions 23-1 with each other.

When the upper cover 20 is coupled to an upper portion of the lower cover 10, the upper inclined portion 23-1 may be positioned above the lower inclined portion 13-1 corresponding thereto, and the upper horizontal portion 23-2 may be positioned above the lower horizontal portion 13-2 corresponding thereto.

The upper cover 20 may be coupled to the upper portion of the lower cover 10 by a coupling that seals the upper cover 20 and the lower cover 10 (e.g., by riveting, welding, bolting, etc.).

When the lower cover 10 and the upper cover 20 are coupled with each other, a space may be formed therebetween. A distance between the lower cover 10 and the upper cover 20 in the space may be different at different positions (e.g. the distance between one of the upper bodies 21 and a corresponding lower body 11 may be different from the distance between the upper central portion 23 and the lower central portion 13). The distance be smaller between the upper central portion 23 and the lower central portion 13 than between the upper bodies 21 and the corresponding lower bodies 11.

When the lower cover 10 and the upper cover 20 are coupled with each other, a side space 31 may be formed between the lower body 11 and the upper body 21, and a tunnel portion 33 may be formed between the lower central portion 13 and the upper central portion 23. A cross-sectional area of the side space 31 may be larger than a cross-sectional area of a tunnel portion 33. For example, a vertical dimension of the tunnel portion 33 may be smaller than a vertical dimension of the side space 31. Based on the different cross-sectional areas, a flow rate of gas (e.g., as may be produced during thermal runaway in a battery cell 49 of the battery module 43) through the tunnel portion 33 may be increased relative to the side space 31 (e.g., according to the Bernoulli principle).

Here, the side space 31 may be the space formed between the upper body 21 and the lower body 11 between the battery pack assembly 41 mounted in the accommodation space 12 and the tunnel portion 33.

The tunnel portion 33 may be formed between the lower central portion 13 and the upper central portion 23, which may respectively connect the pair of lower bodies 11 with each other and the pair of upper bodies 21 with each other. In detail, the tunnel portion 33 may be formed between the pair of lower inclined portions 13-1 and the pair of upper inclined portions 23-1, and between the lower horizontal portion 13-2 and the upper horizontal portion 23-2.

An upper space 34 may be formed between an upper surface of the battery pack assembly 41 and a lower surface of the upper body 21 of the upper cover 20 when the lower cover 10 and the upper cover 20 are coupled with each other and the battery pack assembly 41 is mounted in the accommodation space 12 of the lower body 11. The cross-sectional area of the side space 31 may be larger than a cross-sectional area of the upper space 34.

For example, a vertical dimension of the upper space 34 may be smaller than the vertical dimension of the side space 31. Accordingly, a flow rate of gas (e.g., of gas produced during thermal runaway in a battery cell 49 of the battery module 43) through the upper space 34 may be increased relative to through the side space 31 (e.g., according to the Bernoulli principle).

The battery pack assembly 41 may comprise a plurality of battery modules 43 and an electronic component 45. The battery module 43 may comprise at least one battery cell 49, and for example, a plurality of battery cells 49, which may be stacked (e.g., in a left-right direction), and connected in parallel and/or in series with each other. Any numbers (of battery cells 49, of battery modules 43, and/or of the battery pack assemblies 41) described herein or shown in the accompanying figures are only examples, and the scope of the present disclosure is not limited thereto.

The electronic component 45 may comprise a battery management system (BMS) 46. The battery management system 46 may be configured to detect the voltage and/or temperature of the battery cells 49. The battery management system 46 may be configured to determine a state of each battery module 43 (e.g., based on a detected voltage and/or temperature thereof), and may be configured to manage each battery module 43 to maintain an optimal state. In particular, the battery management system 46 may perform functions such as measuring a remaining capacity of the battery, maintaining the state of charge (SOC) of the battery at an appropriate level, and measuring a temperature of the battery (e.g., battery cell and/or battery module) to manage the battery.

The electronic component 45 may comprise a fuse 47. The fuse 47 may be configured to block supply of overcurrent to each battery module 43 (e.g., based on a signal from the BMS 46).

Two battery pack assemblies 41 may respectively be mounted in two accommodation spaces 12 formed in the lower cover 10, and the two battery pack assemblies 41 may be electrically connected with each other.

Figure 4:
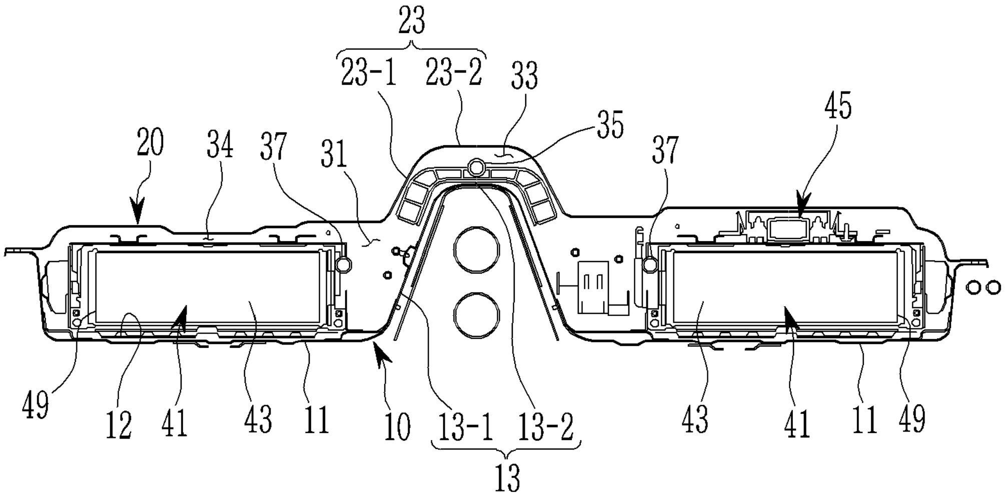
FIG. 4 is a cross-sectional view showing the configuration of a battery system applied to an apparatus for detecting thermal runaway of a battery for an electric vehicle according to an example.

A power relay assembly (PRA) for blocking and/or connecting a flow of high voltage current supplied to each battery module 43 may be mounted in one of the pair of accommodation spaces 12 (e.g., the right accommodation space in FIG. 4). The PRA, or two PRAs, may be installed in each of the pair of accommodation spaces 12.

A water cooling hose for cooling one or more battery pack assemblies 41 may be installed between the lower cover 10 and the upper cover 20 (e.g., one or more water cooling hoses may be installed to be able to cool each of the one or more battery pack assemblies 41.

In addition, a reinforcing material for reinforcing rigidity of the battery system 40 may be positioned in the lower central portion 13.

A venting device 27 may be positioned on the upper cover 20, the venting device 27 configured to be able to discharge gas (e.g., harmful gas or 'venting gas', such as may be produced by the battery cell 49 of the battery module 43) to the outside. The venting device 27 may be fastened to a venting bracket 25 positioned on the upper cover 20.

The venting device 27 may comprise a venting body having a venting hole. The venting device may also have a structure for controlling discharge through the venting hole, such as a valve (e.g., a flap valve, such as a ring-shaped flap valve) positioned in the venting body.

The plurality of venting holes may be formed, and formed in the side or upper portion of the venting body. In addition, the valve may be formed of an elastic material, and may be configured to block the venting hole in a normal state (e.g. non-venting state, non-thermal runaway state, etc.).

In an example operation of the venting device, an internal pressure of the battery system 40 may be increased by excessive gas production, such as the high-temperature and/or harmful gas occurring in the battery cell 49 during thermal runaway. The internal pressure may cause the valve to be deformed upward, which may cause the venting hole to open, which may allow for the gas to be discharged to outside of the battery system 40 through the venting hole.

A high-temperature fluid may flow around the venting device 27 when a high-temperature gas (e.g., produced by the battery cell 49) is discharged through the venting device 27. The venting device 27 may be provided on the upper cover 20 at a position away from and the electronic component 45 to avoid danger of high temperatures causing fusion and/or combustion of one or more components of the electronic component 45.

For example, the electronic component 45 may be positioned on one upper side of the battery pack assembly 41, and the venting device 27 may be positioned on an upper cover 20 corresponding to the other upper side of the battery pack assembly 41.

For example, the electronic component 45 may be installed on one side of the battery pack assembly 41, and the venting device 27 may be positioned on the upper cover 20 corresponding to a position where the electronic component 45 of the battery pack assembly 41 is not installed.

In an example, the electronic component 45 may be positioned on the upper right front of the battery pack assembly 41, and the venting devices 27 may respectively be positioned on the upper cover 20 corresponding to the upper right rear and upper left rear of the battery pack assembly 41. That is, in an example, the venting devices 27 may respectively be positioned on the pair of upper bodies 21 (or left upper body and right upper body) of the upper cover 20.

Through this configuration, it is possible to avoid interference of gas discharged through the venting device 27 with the electronic component 45, thereby preventing damage (e.g., fusion and/or fire) to the electronic component 45.

A first temperature sensor 35 may be positioned in the tunnel portion 33. The first temperature sensor 35 may be configured to detect a temperature of fluid flowing through the tunnel portion 33 (e.g., gas occurring in the battery cell 49).

In addition, a second temperature sensor 37 for detecting a temperature of the battery module 43 may be positioned in each battery module 43. In an example, four second temperature sensors 37 may be provided, although any other number (e.g., one, two, three, four, etc., second temperature sensors 37 may be provided).

The control unit 50 may be configured to determine whether thermal runaway of the battery cell 49 is occurring, based on a temperature of the gas detected by the first temperature sensor 35 and the temperature of the battery module 43 detected by the second temperature sensor 37. The control unit 50 may be configured to cause output of an alarm (e.g., to alert a passenger of a vehicle comprising the battery).

The control unit 50 may be provided as one or more processors operated according to a set program, and the set program may perform each step of a method for controlling the apparatus for detecting thermal runaway of a battery according to an example.

In addition, the apparatus for detecting thermal runaway of a battery according to an example may further comprise the warning unit 60 for providing the alarm for the passenger of the vehicle when the thermal runaway occurs in the battery cell 49. The warning unit 60 may be implemented through a center fascia positioned in the vehicle or a speaker.

When the battery cell 49 (and/or the battery module 43) operates normally, the temperatures detected by the first temperature sensor 35 and the second temperature sensor 37 may be allowed to vary within a predetermined range.

However, when thermal runaway occurs in the battery cell 49, the high-temperature gas may be discharged from the inside of the battery cell 49, and the high-temperature harmful gas may flow into the upper space 34 and the tunnel portion 33 through the side space 31 between the lower cover 10 and the upper cover 20. That is, pressures in the upper space 34 and the tunnel portion 33 may be lower due to the narrow gap of the upper space 34 and the tunnel portion 33 (for example, due to the Bernoulli principle), which may cause the harmful gas discharged from the battery cell 49 to flow from the side space 31 to the upper space 34 and the tunnel portion 33, the pressures of which are lower.

Figure 5:
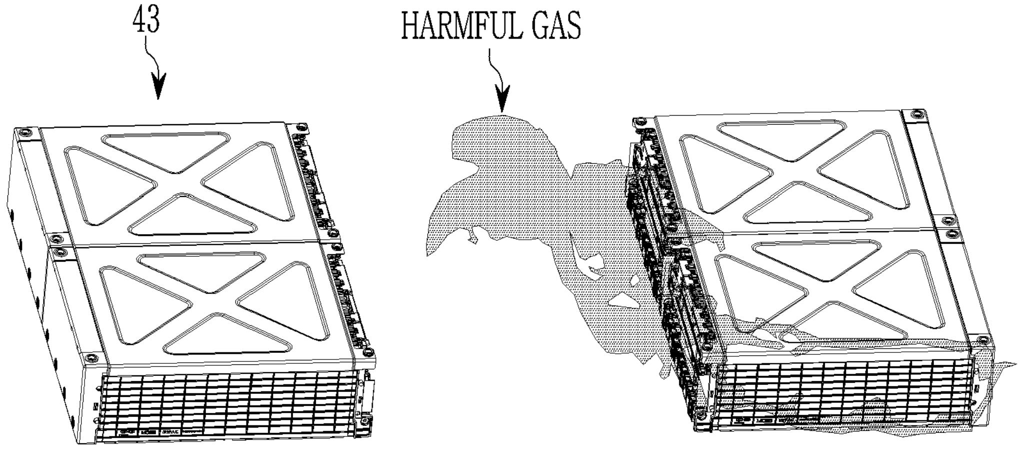
FIG. 5 is a view showing a result of analyzing a flow of harmful gas discharged from a battery cell according to an example.

This phenomenon is illustrated by an analysis result shown in FIG. 5. Referring to FIG. 5, only the battery assemblies are shown so as to visualize where gas discharged from a battery cell 49 may tend to flow (i.e., the upper cover 20 and lower cover 10 are not shown but are modeled as boundaries for the gas flow). The modeled gas discharged from the battery cell 49 flows from the side space 31 to the upper space 34 and the tunnel portion 33 as the pressure in the upper space 34 and the tunnel portion 33 are lower than in the side space 31. However, diffusion of gas into the tunnel portion 33 occurs more than diffusion into the upper space 34 (e.g., due to structural shapes of the lower inclined portion 13-1 of the lower body 11 and the upper inclined portion 23-1 of the upper body 21).

The gas may be discharged to the outside of the battery pack assembly 41 through the upper space 34 and the venting device 27 when a certain amount or more harmful gas is produced by the battery cell 49. That is, the harmful gas discharged from the battery cell 49 may fill the tunnel portion 33 and the side space 31 to some extent, and then be discharged to the outside of the battery pack assembly 41 through the venting device 27.

As such, the gas from the battery cell 49 may diffuse into the tunnel portion 33 due to a structural characteristic of the tunnel portion 33, and then be discharged to the outside of the battery pack assembly 41 through the venting device 27.

Accordingly, the control unit 50 receive information indicating the temperature of the gas measured by the first temperature sensor 35 installed in the tunnel portion 33, and quickly determine whether the thermal runaway is occurring in the battery cell 49 based on the temperature of the harmful gas detected and measured by the first temperature sensor 35.

Figure 6:
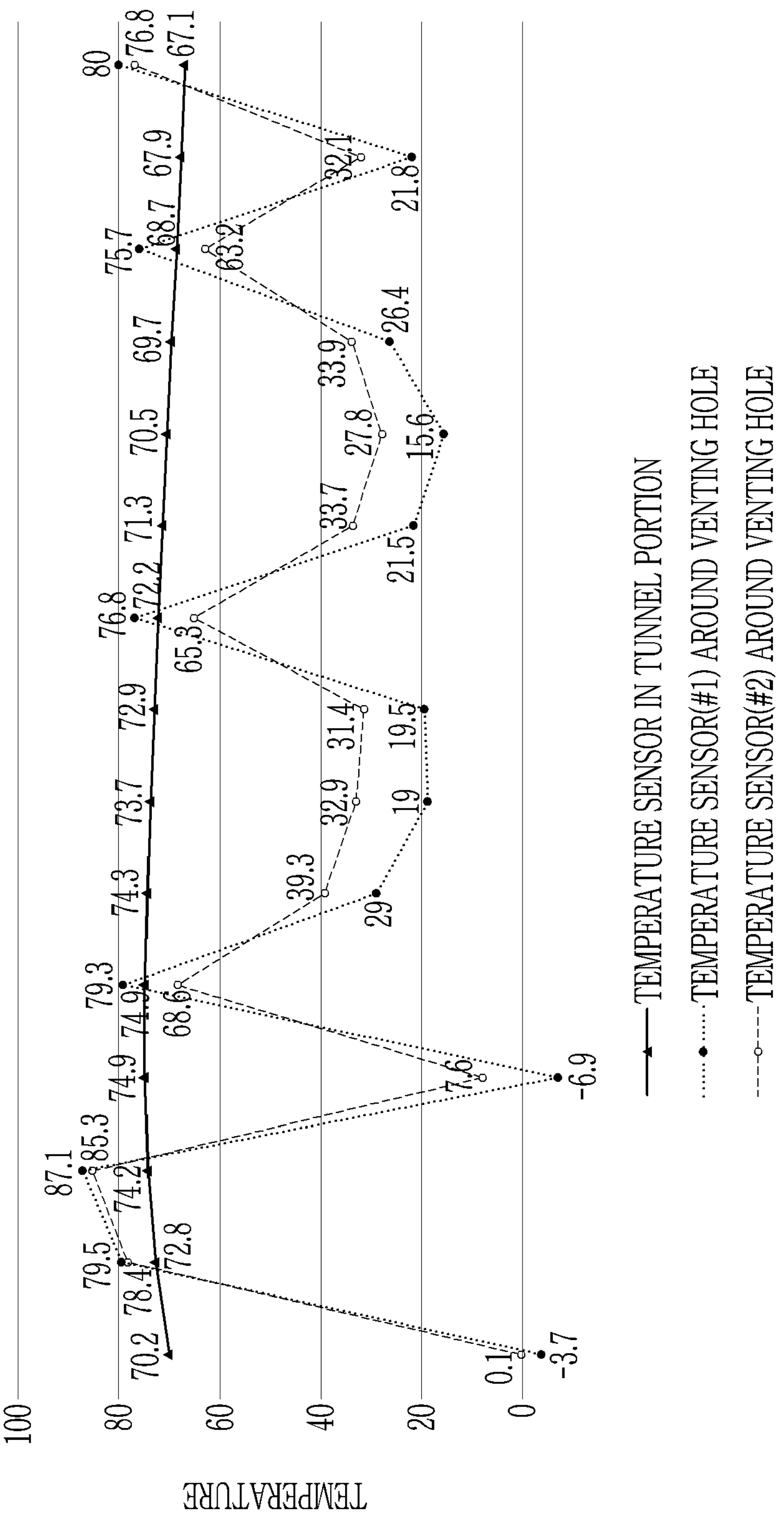
FIG. 6 and FIG. 7 are graphs showing a temperature of the harmful gas that is detected by a first temperature sensor and a temperature of a battery module that is detected by a second temperature sensor according to an example.

As demonstrated by the temperature measurements shown in FIG. 6, if the temperature sensor were installed around the venting device 27 in the upper space 34, the temperature of the gas may be hard to measure accurately and/or consistently, as the temperature of the gas may be dispersed due to rapid inflow and outflow around the venting device 27.

On the other hand, the gas may have a largely uniform flow and temperature in the tunnel portion 33, and the temperature of the harmful gas, measured by the temperature sensor 35 installed in the tunnel portion 33, is hardly dispersed (see FIG. 6). Therefore, it easier to accurately and consistently measure the temperature of the gas using the temperature sensor 35 installed in the tunnel portion.

The control unit 50 may determine that thermal runaway is occurring in the battery cell 49 when a temperature change detected by the first temperature sensor 35 has a speed greater than or equal to a set speed (e.g., 1° C./s, 2° C./s, 3° C./s, etc.), and/or lasts for time longer than or equal to set time (e.g., 2 seconds, 4 seconds, 6 seconds, etc.), and/or the changed temperature is higher than or equal to a set temperature (e.g., 60° C., 70° C., 80° C., etc.). The set speed, set time, and/or set temperature may be selected based on, for example, the application of the battery, material properties of the battery components etc.

In addition, the control unit 50 may be configured to determine whether thermal runaway is occurring in the battery cell 49 based on the temperature of the battery module 43, which may be detected by the second temperature sensor 37 installed in the battery module 43.

The control unit 50 may be configured to determine that the thermal runaway occurs in the battery cell 49 when a temperature change detected by the second temperature sensor 37 has a speed greater than or equal to the set speed (e.g., 1° C./s, 2° C./s, 3° C./s, etc.) and lasts for time longer than or equal to the set time (e.g., 2 seconds, 4 seconds, 6 seconds, etc.), and/or the changed temperature is higher than or equal to the set temperature (e.g., 60° C., 70° C., 80° C., etc.). As above, the set speed, set time, and/or set temperature may be selected based on, for example, the application of the battery, material properties of the battery components, etc.

As described above, a fire may occur in the battery cell 49 when the thermal runaway occurs in the battery cell 49 and an excessive amount of the gas thus occurs in the battery cell 49. A fire in a vehicle caused by a battery fire may lead a very dangerous situation for the passenger in the vehicle.

Therefore, the control unit 50 may be configured notify the passenger of the vehicle through the warning unit 60 based on determining that the thermal runaway is occurring in the battery cell 49. This may protect the passenger from the thermal runaway of the battery cell 49 and any resulting vehicle fire. In addition, the \ gas discharged from the battery cell 49 may be discharged to the outside of the battery pack assembly 41 through the venting device 27, thereby significantly reducing ignition possibility of the battery pack assembly 41. Here, the venting device 27 may be positioned away from the electronic component 45, which may prevent the electronic component 45 from being fused due to the high-temperature gas discharged through the venting device 27.

In addition, it may be determined whether the thermal runaway occurs in the battery cell 49 based on the temperature of the gas detected by the first temperature sensor 35 installed in the tunnel portion 33 formed between the lower central portion 13 of the lower cover 10 and the upper central portion 23 of the upper cover 20. Therefore, it is possible to quickly determine whether the thermal runaway occurs in the battery cell 49.

Figure 7:
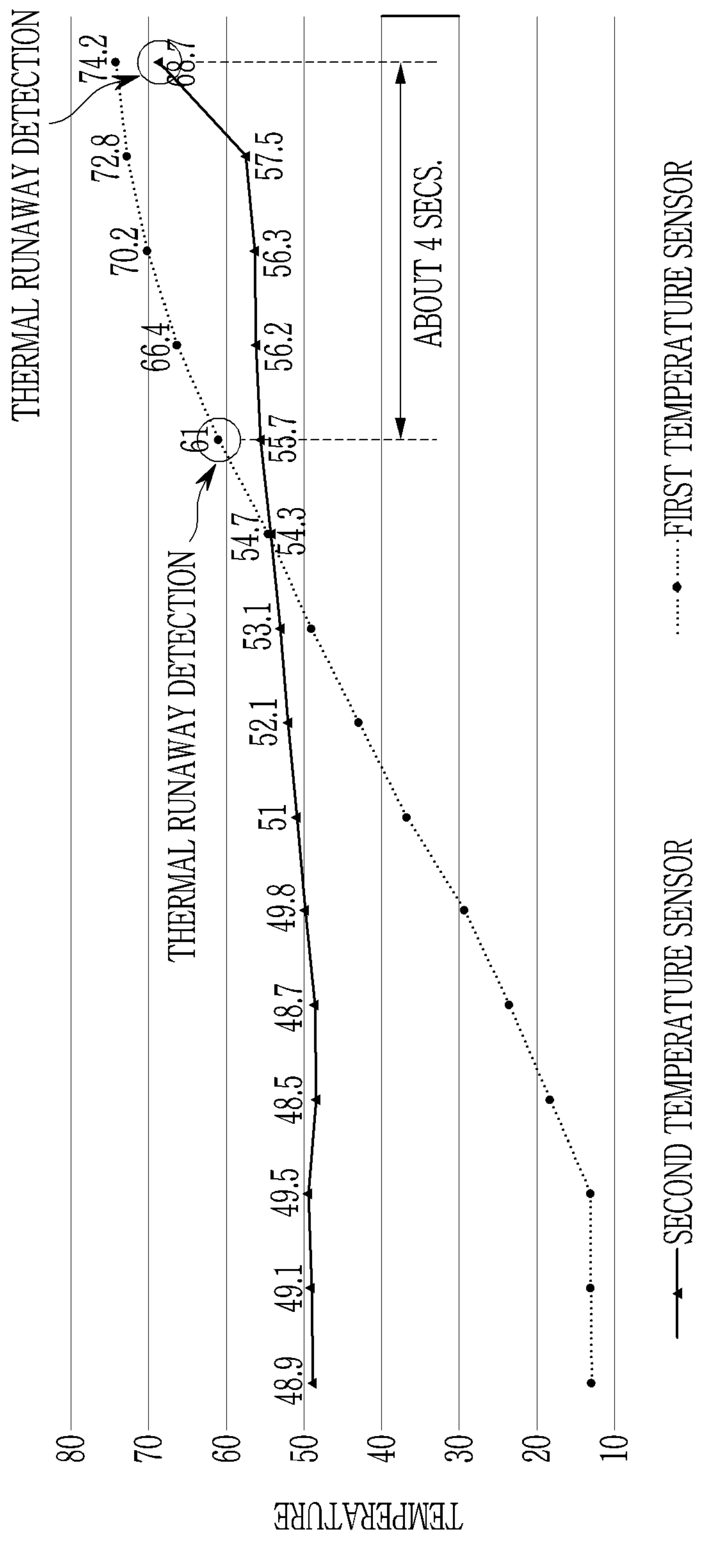

As shown in FIG. 7, the temperature change detected by the first temperature sensor 35 (e.g., installed in the tunnel portion 33) measuring the temperature of gas was detected faster by about 4 seconds than the temperature change detected by the second temperature sensor 37 measuring the temperature of the battery module 43. As such, the temperature sensor 35, positioned as described above with respect to structural characteristics of the lower cover 10 and the upper cover 20 that form an exterior of the battery pack assembly 41, make it possible to more quickly determine whether thermal runaway is occurring in the battery cell 49.

An apparatus may be configured to detect thermal runaway of a battery (e.g., for an electric vehicle). The apparatus may also be configured to generate and/or send a warning (e.g., of danger to a passenger of a vehicle comprising the battery).

According to an example, an apparatus for detecting thermal runaway of a battery comprises a battery system, wherein the battery system comprises: a lower cover that forms at least one pair of accommodation spaces; an upper cover coupled to an upper portion of the lower cover; a battery pack assembly mounted in each accommodation space, and comprising at least one battery module and an electronic component; and a venting device positioned on the upper cover to discharge gas occurring in a battery cell of the battery module.

The venting device may be configured to be able to vent gas from within the battery (e.g., fastened to a venting bracket positioned on and/or in the upper cover).

The electronic component may be positioned on one upper side of the battery pack assembly, and the venting device may be positioned on the upper cover corresponding to the other upper side of the battery pack assembly.

The lower cover may comprise: a pair of lower bodies; and a lower central portion positioned between the pair of lower bodies, and the accommodation spaces may respectively be formed in the pair of lower bodies positioned on both sides of the lower central portion.

A height of the lower central portion may be greater than a height of the accommodation space.

The lower central portion may be convex upward from the lower body.

The upper cover may comprise an upper central portion protruding upward, and be coupled with the lower cover while being spaced apart from the lower cover.

A distance between the upper cover and the lower cover may be set to the smallest distance between the upper central portion and the lower central portion.

The apparatus may further comprise: a first temperature sensor positioned in a tunnel portion formed between the lower central portion and the upper central portion and detecting a temperature of the gas occurring in the battery cell; and a second temperature sensor positioned in each battery module and detecting a temperature of the battery module.

The apparatus may further comprise a control unit determining thermal runaway of the battery cell based on the temperature of the gas detected by the first temperature sensor or the temperature of the battery module detected by the second temperature sensor.

The control unit may determine that the thermal runaway occurs in the battery cell of the battery module when a temperature change of the gas detected by the first temperature sensor has a speed greater than or equal to a set speed and lasts for time longer than or equal to set time, and the changed temperature is higher than or equal to a set temperature, or a temperature change of the battery module detected by the second temperature sensor has a speed greater than or equal to the set speed and lasts for time longer than or equal to the set time, and the changed temperature is higher than or equal to the set temperature.

The apparatus may further comprise a warning unit for providing (e.g., generating and/or outputting or sending) an alarm and/or alert (e.g., for a passenger of a vehicle comprising the battery) to indicate that the thermal runaway is occurring in the battery cell.

According to the apparatus for detecting thermal runaway of a battery according to an example as described above, the temperature sensor for detecting the temperature of the battery module may be positioned using the structural characteristics of the lower cover and the upper cover that form the exterior of the battery pack assembly, and it is thus possible to quickly determine whether the thermal runaway occurs in the battery cell.

While the present subject matter has been described in connection with what is presently considered to be a practical example, it is not limited thereto. On the contrary, this disclosure is intended to cover various modifications and equivalent arrangements included within the spirit and scope of the appended claims.

What is claimed is:

1. An apparatus comprising:

a first cover that forms at least two accommodation spaces;

a second cover configured to be coupled to the first cover so as to form an internal space comprising the at least two accommodation spaces and a tunnel portion between the at least two accommodation spaces;

a battery pack assembly comprising at least one battery module mounted in at least one of the at least two accommodation spaces;

electronic circuitry configured to manage the at least one battery module; and a vent positioned away from the electronic circuitry and the tunnel portion and configured to discharge gas from the internal space, wherein a side space is formed between a first body of the first cover and a second body of the second cover, and wherein a cross-sectional area of the side space is greater than a cross-sectional area of the tunnel portion, wherein the first cover comprises:

a plurality of first bodies; and a first central portion positioned between the plurality of first bodies, wherein each of the at least two accommodation spaces is respectively formed in one of the plurality of first bodies, wherein the second cover comprises:

a plurality of second bodies; and a second central portion positioned between, and protruding upward from, the plurality of second bodies, and wherein, when the second cover is coupled with the first cover, the plurality of second bodies are spaced apart from the plurality of first bodies and the second central portion is spaced apart from the first central portion.

2. The apparatus of claim 1, wherein the vent is fastened to a venting bracket positioned on the second cover.

3. The apparatus of claim 1, wherein the electronic circuitry is positioned to a first side of the tunnel portion, and the vent is positioned on the second cover corresponding to a second side of the tunnel portion.

4. The apparatus of claim 1, wherein a height of the first central portion is greater than a height of the at least two accommodation spaces.

5. The apparatus of claim 1, wherein the first central portion is convex upward from the plurality of first bodies.

6. The apparatus of claim 1, wherein, the second central portion protrudes upward from the plurality of second bodies to a height such that, when the second cover is coupled with the first cover, a distance between the second central portion and the first central portion is smaller than a distance between a first body of the plurality of first bodies and a corresponding second body of the plurality of second bodies.

7. The apparatus of claim 1, wherein the tunnel portion is formed between the first central portion and the second central portion.

8. The apparatus of claim 7, further comprising:

a first temperature sensor disposed in the tunnel portion formed between the first central portion and the second central portion.

9. The apparatus of claim 8, further comprising a controller configured to determine, based on a temperature reading from the first temperature sensor, whether a criteria for thermal runaway of a battery is satisfied.

10. The apparatus of claim 9, wherein the criteria comprises one or more of:

a temperature change by at least a set rate of change;

a temperature change that lasts at least a set time; or a temperature change to at least a set temperature.

11. The apparatus of claim 10, further comprising an alarm device connected to the controller and configured to cause output of an alarm based on a determination that the criteria for thermal runaway is satisfied.

12. The apparatus of claim 8, further comprising:

a second temperature sensor positioned proximate to the at least one battery module and configured to measure a temperature of the at least one battery module.

13. The apparatus of claim 12, further comprising a controller configured to determine, based on a temperature reading from at least one of the first temperature sensor or the second temperature sensor, whether a criteria for thermal runaway of a battery is satisfied.

14. The apparatus of claim 13, wherein the criteria comprises one or more of:

a temperature change by at least a set rate of change;

a temperature change that lasts at least a set time; or a temperature change to at least a set temperature.

15. The apparatus of claim 14, further comprising an alarm device connected to the controller and configured to cause output of an alarm based on a determination that the criteria for thermal runaway is satisfied.

16. An apparatus comprising:

a first cover that forms at least two accommodation spaces;

a second cover configured to be coupled to the first cover so as to form an internal space comprising the at least two accommodation spaces and a tunnel portion between the at least two accommodation spaces;

a battery pack assembly comprising at least one battery module mounted in at least one of the at least two accommodation spaces;

electronic circuitry configured to manage the at least one battery module; and a vent positioned away from the electronic circuitry and the tunnel portion and configured to discharge gas from the internal space, wherein the first cover comprises:

a plurality of first bodies; and a first central portion positioned between the plurality of first bodies, wherein each of the at least two accommodation spaces is respectively formed in one of the plurality of first bodies, wherein the second cover comprises:

a plurality of second bodies; and a second central portion positioned between, and protruding upward from, the plurality of second bodies, and wherein, when the second cover is coupled with the first cover, the plurality of second bodies are spaced apart from the plurality of first bodies and the second central portion is spaced apart from the first central portion.

* * * * *